United States Patent
Johnston (10) Patent No.: US 11,471,771 B2
(45) Date of Patent: Oct. 18, 2022

(54) SYSTEM AND METHOD FOR INFORMATION GATHERING GAMES FOR CUSTOMER QUEUES

(71) Applicant: Verint Americas Inc., Alpharetta, GA (US)

(72) Inventor: Michael Johnston, Alpharetta, GA (US)

(73) Assignee: VERINT AMERICAS INC., Alpharetta, GA (US)

(\*) Notice: Subject to any disclaimer, the term of this patent is extended or adjusted under 35 U.S.C. 154(b) by 84 days.

(21) Appl. No.: 17/065,201

(22) Filed: Oct. 7, 2020

(65) Prior Publication Data
US 2022/0105435 A1 Apr. 7, 2022

(51) Int. Cl.
*H04M 3/51* (2006.01)
*A63F 13/61* (2014.01)
*A63F 13/79* (2014.01)
*H04M 11/08* (2006.01)

(52) U.S. Cl.
CPC .............. *A63F 13/61* (2014.09); *A63F 13/79* (2014.09); *H04M 3/51* (2013.01); *H04M 3/5183* (2013.01); *H04M 3/5191* (2013.01); *H04M 11/08* (2013.01)

(58) Field of Classification Search
CPC .... H04M 3/51; H04M 3/5183; H04M 3/5191; H04M 7/0012; H04M 7/0024; H04M 7/0027; H04M 11/08
See application file for complete search history.

(56) References Cited

U.S. PATENT DOCUMENTS

| | | | | |
|---|---|---|---|---|
| 8,200,527 B1* | 6/2012 | Thompson | ............. | G06Q 30/00 705/7.41 |
| 8,737,598 B2* | 5/2014 | Bruce | ................. | H04M 7/0024 379/265.09 |
| 8,767,948 B1 | 7/2014 | Riahi et al. | | |
| 9,020,121 B1* | 4/2015 | Dhanda | ............... | H04M 3/5191 379/266.04 |
| 11,093,871 B2* | 8/2021 | Diriye | .............. | G06Q 10/06316 |
| 2002/0071541 A1* | 6/2002 | Cheung | ............... | H04M 3/4285 379/215.01 |
| 2003/0003898 A1* | 1/2003 | Banerjee | .................. | H04W 4/16 455/566 |
| 2003/0103621 A1* | 6/2003 | Brown | ................ | H04M 3/5233 379/266.01 |
| 2003/0108186 A1* | 6/2003 | Brown | ................... | H04M 3/493 379/266.01 |
| 2003/0177017 A1* | 9/2003 | Boyer | ................ | G06Q 30/0281 705/304 |

(Continued)

OTHER PUBLICATIONS

International Search Report and Written Opinion for PCT/US2021/044759, dated Nov. 24, 2021, from the European Patent Office.

*Primary Examiner* — Steven J Hylinski
(74) *Attorney, Agent, or Firm* — Christopher M. Scherer; DeWitt LLP (57) ABSTRACT

The present application includes a method and system for gathering customer information through games. The system transmits offers to play games over the contact medium used by the customer. The games are selected to elicit information from the customer; information ranging from the customer's mood to marketing information to security information. The information so obtained can be used to update client profiles.

19 Claims, 5 Drawing Sheets

(56) References Cited

U.S. PATENT DOCUMENTS

| | | | |
|---|---|---|---|
| 2006/0182258 A1* | 8/2006 | Sisselman | H04M 3/5175 379/265.02 |
| 2008/0139315 A1* | 6/2008 | O'Connor | A63F 13/85 463/42 |
| 2008/0247525 A1* | 10/2008 | LeBlanc | H04M 3/493 379/101.01 |
| 2008/0260138 A1* | 10/2008 | Chen | H04M 3/5238 379/215.01 |
| 2010/0306021 A1* | 12/2010 | O'Connor | G06Q 10/0637 706/46 |
| 2013/0204667 A1* | 8/2013 | Brown | G06Q 30/0201 705/7.32 |
| 2013/0343532 A1* | 12/2013 | Castle | H04M 3/4285 379/215.01 |
| 2014/0270109 A1* | 9/2014 | Riahi | G06N 20/00 379/88.01 |
| 2018/0007204 A1* | 1/2018 | Klein | H04M 3/5166 |
| 2018/0007206 A1* | 1/2018 | Klein | H04M 3/5166 |
| 2020/0169636 A1* | 5/2020 | Hillier | H04L 65/1046 |

\* cited by examiner

SYSTEM AND METHOD FOR INFORMATION GATHERING GAMES FOR CUSTOMER QUEUES

BACKGROUND

The present disclosure is directed to a method for computer analysis, specifically a method for gathering customer information through games.

In a modern high-volume customer engagement center (CEC), customers may need to wait for a considerable time to interact with a customer service representative (CSR). Long wait time during peak hours may lead to frustration and in turn damage the customer relationship once a CSR is able to interact with the customer, especially if the CSR does not know that the customer is frustrated. Particularly unengaged customers may give up on interacting with a CSR, leading to further bad feeling.

The more frustrated a customer is, the less likely they are to participate in information-gathering endeavors, especially if they do not perceive a benefit to themselves. Even an otherwise good-tempered customer may bridle at overt attempts to gather marketing information. By contrast, a bad-tempered customer may not be willing to volunteer even essential information.

There is an unmet need in the art for a system and method capable of engaging and entertaining a waiting customer while still gathering valuable information.

SUMMARY

An exemplary embodiment of the present application is a method for gathering customer information through games played on a dynamic monitoring (DM) system in a customer engagement center (CEC) system. The method includes the steps of providing the DM system in the CEC system, which includes a dynamic monitoring engine (DME), a contact medium, a customer database, and a gaming library. The contact medium is selected from the group consisting of a telephone line and an Internet connection. The DME is operably connected to the contact medium, customer database, and the gaming library. The DME includes at least one set of analytics rules. The customer database includes at least one customer profile. The gaming library includes at least one game. The DME receives a customer contact from a customer and transmits a gameplay offer to the customer over a contact medium. If the customer accepts the offer of gameplay, the method continues to the steps of the DME processing any known identifying customer information, looking up the customer in a customer database using the known identifying customer information, selecting at least one game from a gaming library, running the selected game for play with the customer to acquire the desired customer information, and updating the customer database with the customer information acquired. The game allows the acquisition of desired customer information. If the customer refuses the offer of gameplay, the method continues to the step of placing the customer in a queue.

Another exemplary embodiment of the present application is a CEC system for gathering customer information through games. The CEC system includes a DM system. This DM system includes a DM processor and a non-transitory computer readable medium programmed with computer readable code that upon execution by the DM processor causes the DM processor to execute the above-mentioned method for gathering customer information through games.

Another exemplary embodiment of the present application is a non-transitory computer readable medium programmed with computer readable code that upon execution by a DM processor causes the DM processor to execute the above-mentioned method for gathering customer information through games on a CEC system.

The objects and advantages will appear more fully from the following detailed description made in conjunction with the accompanying drawings.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1:
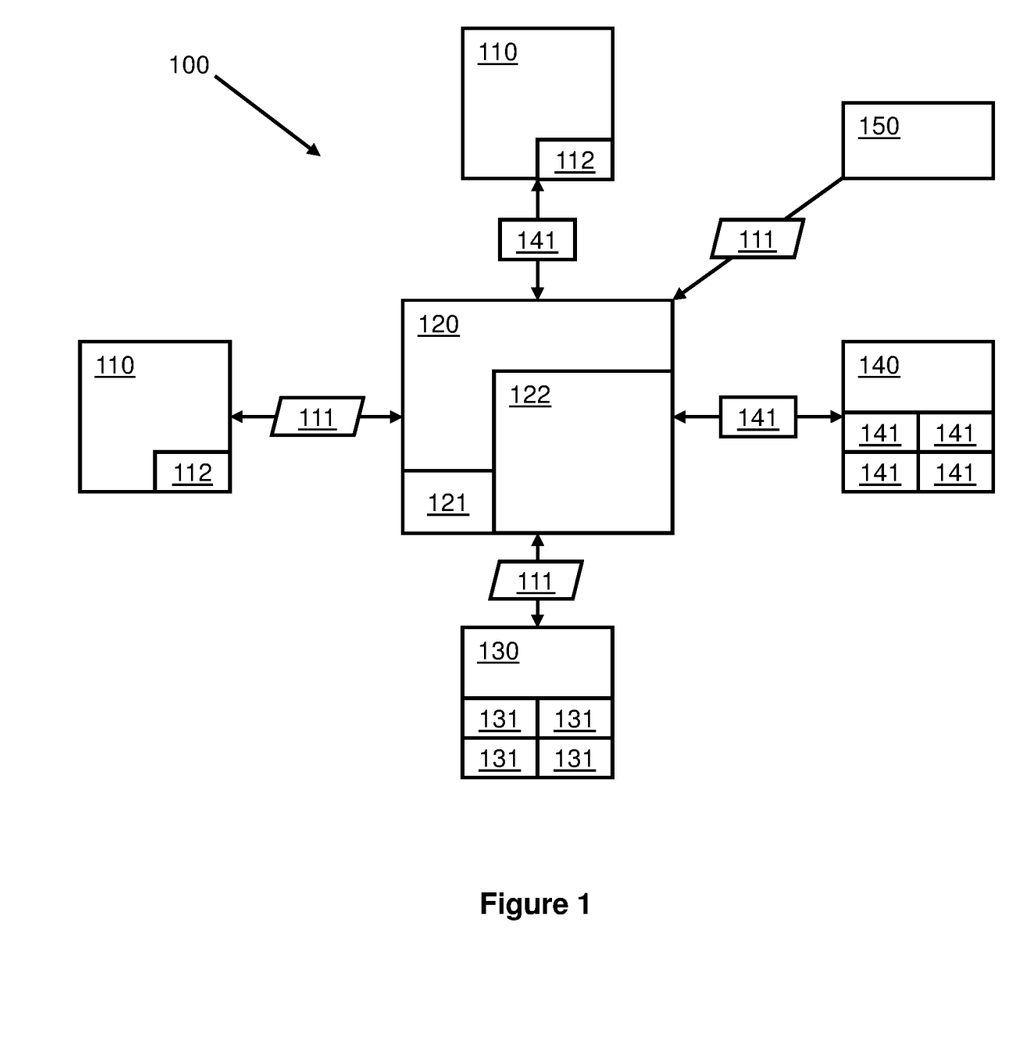
FIG. 1 depicts an exemplary embodiment of a dynamic monitoring system for gathering customer information through games.

Dynamic monitoring (DM) systems used on a CEC system allow engagement with waiting customers via the medium of games. By playing games with waiting customers in the CEC system, the DM system can allow an organization to achieve several key benefits. First, the DM system can alleviate the boredom experienced by customers during the wait to interact with a CSR. Second, the DM system can monitor the customer's mood during gameplay, ensuring that the CSR enters the interaction with an understanding of the customer's temperament. Playing the game may itself assuage the customer's mood. Third, the DM system can obtain information from the customer that may otherwise be difficult to extract. The DM system can use the game to gather information from the customer that will help with identity and verification, populating the customer profile, and other contact center actions that aid call resolution and future marketing FIG. 1 depicts an exemplary embodiment of DM system 100 for gathering customer information through games. The DM system 100 is located on or as a part of a larger CEC system (not shown). The DM system 100 includes a Dynamic Monitoring Engine (DME) 120 capable of interactions with customers. In the embodiment shown, the DME 120 can accommodate multiple simultaneous customer contacts 110. In other embodiments, multiple DMEs 120 may each sequentially handle a single customer contact 110. Other embodiments may use any combination of the above embodiments, whether single or multiple DMEs 120 or single or multiple customer contacts 110.

The customer contact 110 may interface with the DME 120 through Internet and/or telephone connections for sending and/or receiving customer information 111. The customer contact 110 may include customer contact metadata 112 which can be accessed by a CSR or the DME 120. Such customer contact metadata 112 can include length of time waiting, time of initial contact, games played, customer mood, and/or any other information which may be useful in resolving the customer contact 110.

The DME 120 is configured to send, receive, and analyze customer information 111. The analysis may be a real-time analysis of streaming data or batch analysis of data. The DME 120 may include at least one set of analytics rules 121 used to analyze data and a DM storage unit 122. The analytics rules 121 may be stored in the DM storage unit 122, along with any raw data, processed information, or analytics results.

The analytics rules 121 determine the priority of requests for additional data, determine which games to offer the customer, and determine if a customer is showing warning signs of worsening mood. The analytics rules 121 may be static or may be dynamically updated by the DME 120, a CSR, and/or a third party. By way of non-limiting example, the DME 120 may utilize the analytics rules 121 to perform voice and/or text analytics on the customer contact 110 to determine customer mood.

The DME 120 may retrieve customer information 111 related to a specific customer from a customer database 130. Such customer information 111 may be included in at least one customer profile 131. Customer profiles 131 may include customer information 111 such as, but not limited to, identifying information, marketing information, security information, and/or customer contact history. When the DME 120 makes a customer contact 110, the DME 120 may receive customer information 111 from the customer contact 110 to retrieve or update the appropriate customer profile 131. Furthermore, the DME 120 may analyze the customer profile 131 using the analytics rules 121 to determine if any customer information 111 is missing.

By way of non-limiting example, if a marketing initiative is attempting to obtain email addresses, the DME 120 may determine that such customer information 111 is missing from a customer profile 131 where contact has only occurred over the telephone. By way of another non-limiting example, if another marketing initiative is attempting to obtain social media handles, the DME 120 may determine that such customer information 111 is missing from all customer profiles 131, as such information has never been acquired previously. By way of another non-limiting example, if new mailing address information is required due to physical mail being returned, the DME 120 may determine that such customer information 111 is missing from the customer profile 131 due to a flag placed on the customer profile 131.

When customer information 111 is missing, the DME 120 may utilize at least one game 141 from at least one gaming library 140 to retrieve this customer information 111. By way of non-limiting example, the games 141 may include trivia quizzes, multiple-choice questions, or visual- or text-based games such as, but not limited to, Space Invaders or Asteroids. The games 141 must be playable over the contact medium; while a multiple-choice game could be played over a telephone line or the Internet, a graphics-based arcade game would require an Internet connection. The DME 120 may utilize the analytics rules 121 to prioritize information gathering using particular games 141. By way of non-limiting example, a game 141 which captures security information may be prioritized over a game 141 which captures marketing information.

Each game 141 may capture information via different methods. By way of non-limiting examples, a game 141 may collect social media handles by offering publish a high score to a social media account. The game 141 may collect emotional heuristics for customer contact 110 based on click or other reaction speed. The game 141 may collect information on the customer's interests through game choice or questions they choose to answer. Multiple different games 141 may collect the same or similar information to provide correlation of customer information 111 or to allow for different customers' tastes in games.

The customer information 111 collected in the game 141 may be analyzed using the analytics rules 121. Once analyzed, such customer information 111 can be used. By way of non-limiting examples, customer information 111 can populate a customer profile 131, update customer contact metadata 112, be used to calculate influencer ratings on social media from gathered social media handles and used to promote in routing and queuing, or used to search for recent social posts to assist a CSR by providing context in problem resolution. In certain embodiments, customer information 111, customer contact metadata 112, and/or any other information may be provided to the DME 120 by at least one external system input 150. The external system input 150 may be another DM system 100, a different information-gathering system, or any other system or database capable of gathering and transmitting information.

Figure 2A:
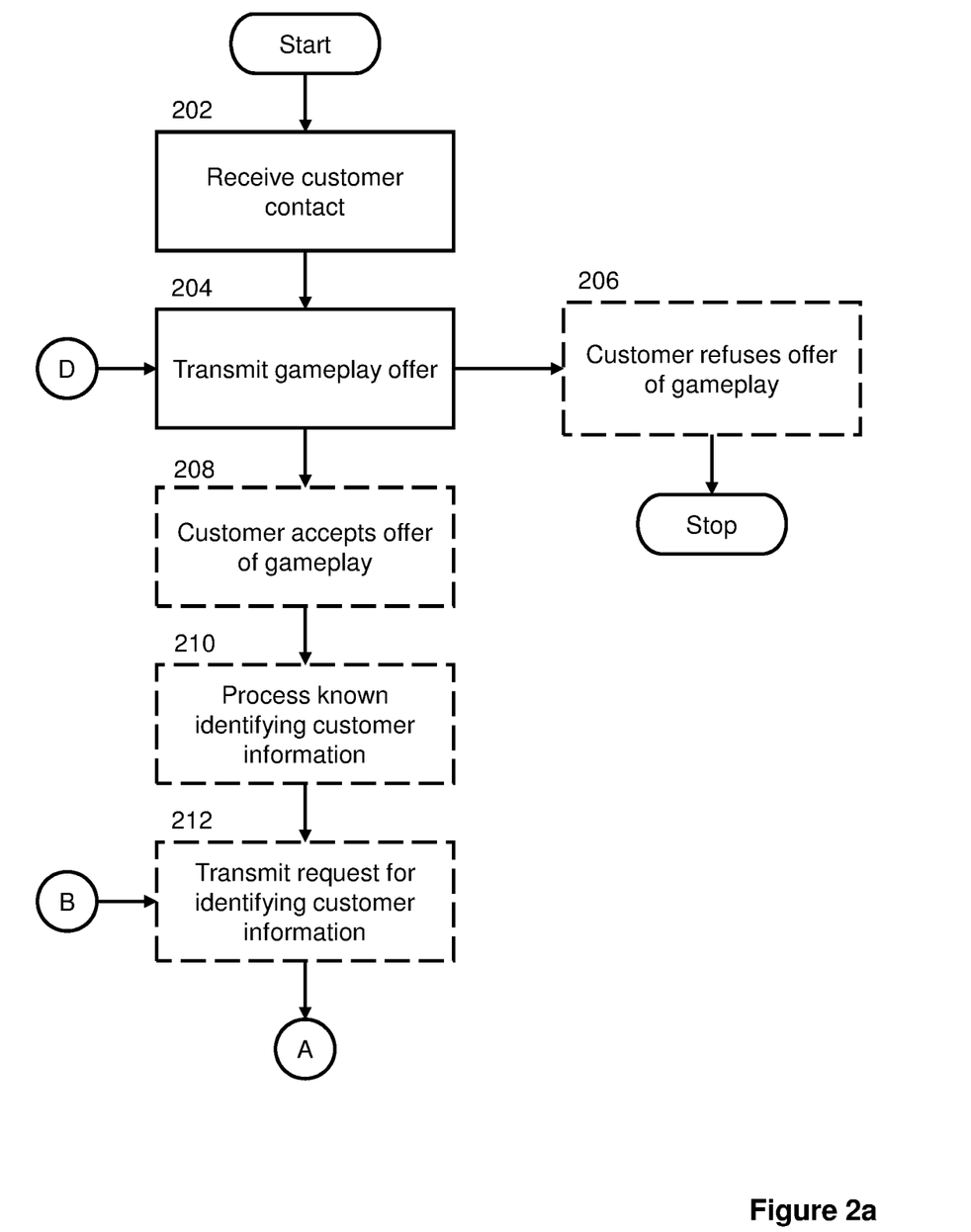
FIGS. 2a, 2b, and 2c depict a flowchart of an exemplary embodiment of a method for gathering customer information through games.
Figure 2B:
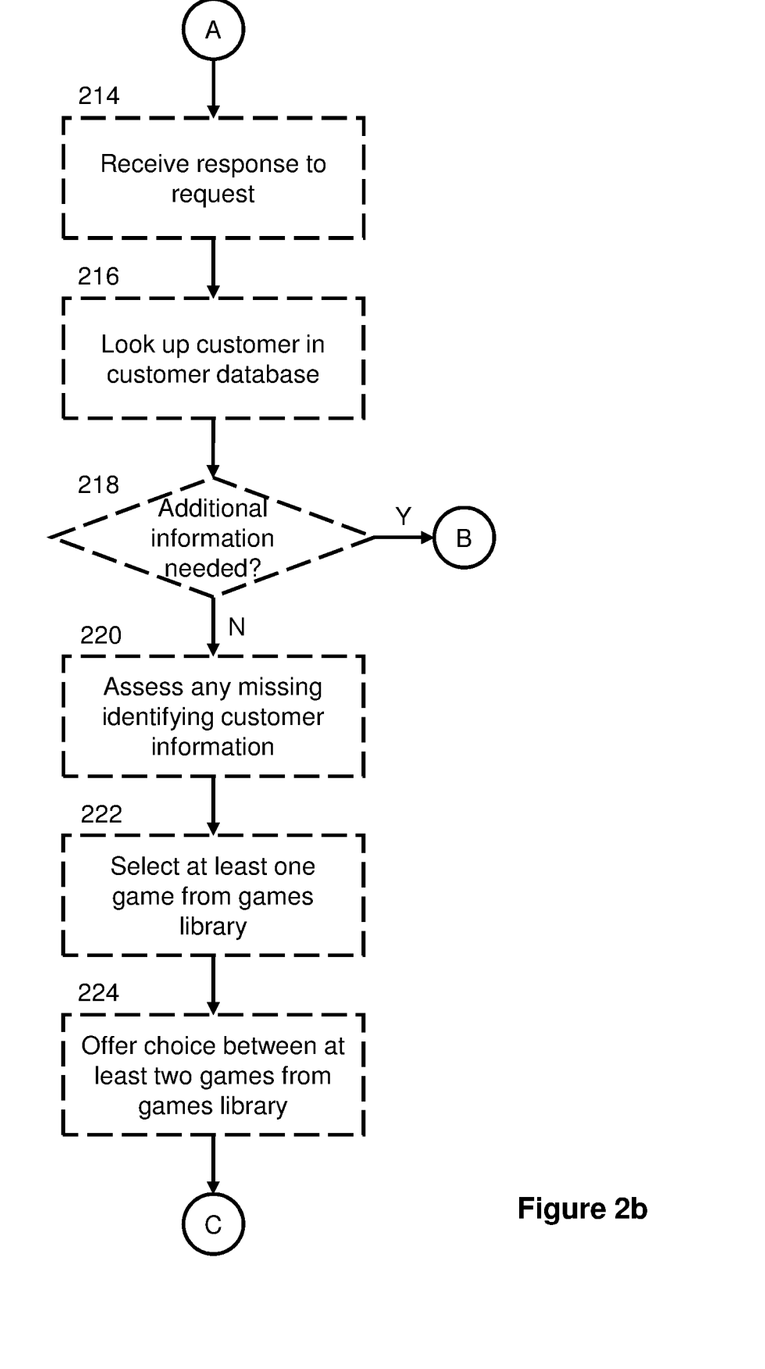
Figure 2C:
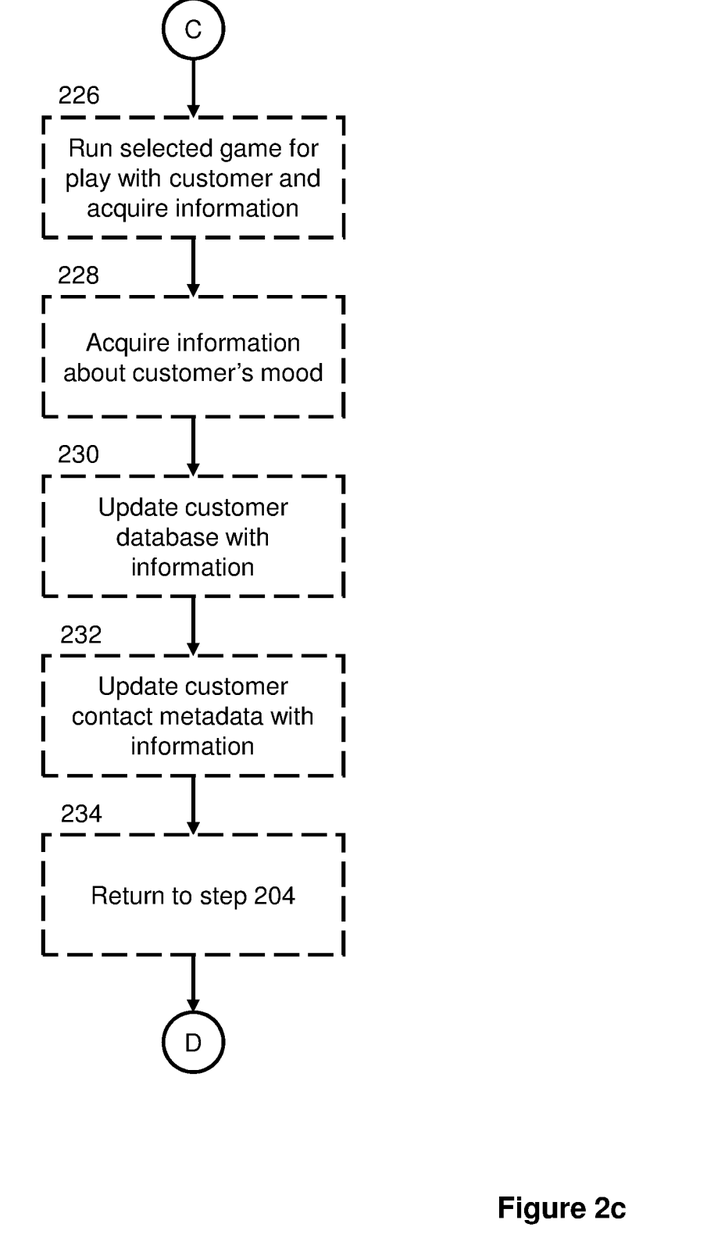

FIGS. 2a, 2b, and 2c depict a flowchart of an exemplary embodiment of method 200 for gathering customer information through games using the DM system 100 on or in the CEC system.

Referring to FIG. 2a, in step 202, the DM system receives a customer contact. This contact may be an initial CEC contact with the customer, an initial contact with a waiting customer, or a repeated contact from a waiting customer. This contact may extend over the contact medium of telephone lines or the Internet.

In step 204, the DME transmits a gameplay offer to the customer over the contact medium.

In optional step 206, the customer refuses the offer of gameplay and is placed in a queue, at which point method 200 effectively ceases. In certain embodiments, once the customer is in the queue, they may request to return to step 202 from the queue after a period of time. In other embodiments, once the customer is in the queue, the DM system may return to step 202 after a period of time. The period of time may be predetermined or vary based on the analytics rules of the DM system.

In optional step 208, the customer accepts the offer of gameplay.

In optional step 210, the DME processes any known identifying customer information. The identifying customer information may include, but is not limited to, the customer's name, phone number, account number, social security number, or any other unique identifier utilized by the DM system. This information may have been received from a previous interaction between the customer and DM system, received during the current interaction, or retrieved automatically from external system inputs such as, but not limited to, caller ID.

In optional step 212, the DME transmits at least one request for identifying customer information. The identifying customer information may include, but is not limited to, the customer's name, phone number, account number, social security number, or any other identifier utilized by the DM system.

Referring to FIG. 2b, in optional step 214, the DME receives a response to the at least one request for identifying customer information.

In optional step 216, the DME looks up the customer in the customer database using the identifying customer information obtained in steps 210 and/or 214.

In optional step 218, the DME returns to step 212 if any additional information is needed. If the identifying customer information obtained from step 214 is not sufficient for a definitive identification or additional information is required, the DM system may request additional information.

In optional step 220, the DME assesses any missing identifying customer information for the customer. The analytics rules identify what data is kept for a customer and prioritizes data for acquisition.

In optional step 222, the DME selects at least one game from the gaming library that will allow the capture of any missing customer identifying information and/or the acquisition of desired customer information. By way of non-limiting example, if a customer's birth date is missing, the DME may select a game based on astrology which will require the customer to input a birth date. By way of further non-limiting example, if the desired customer information involves the customer's television viewing habits, the DME may select a game based on various popular television programs.

In optional step 224, the DME offers a choice between at least two games from the gaming library that will allow the capture of missing customer identifying information and/or the acquisition of desired customer information.

Referring to FIG. 2c, in optional step 226, the DME runs the selected game for play with the customer and acquires the missing customer identifying information and/or the desired customer information.

In optional step 228, the DME acquires information about the customer's mood via capture and analysis of their voice or text communications. Steps 226 and 228 may be performed simultaneously.

In optional step 230, the DME updates the customer database with the customer information acquired in steps 226 and/or 228.

In optional step 232, the DME updates the customer contact metadata with the customer information acquired in step steps 226 and/or 228.

In optional step 234, once the game is complete, the DME returns to step 204.

Figure 3:
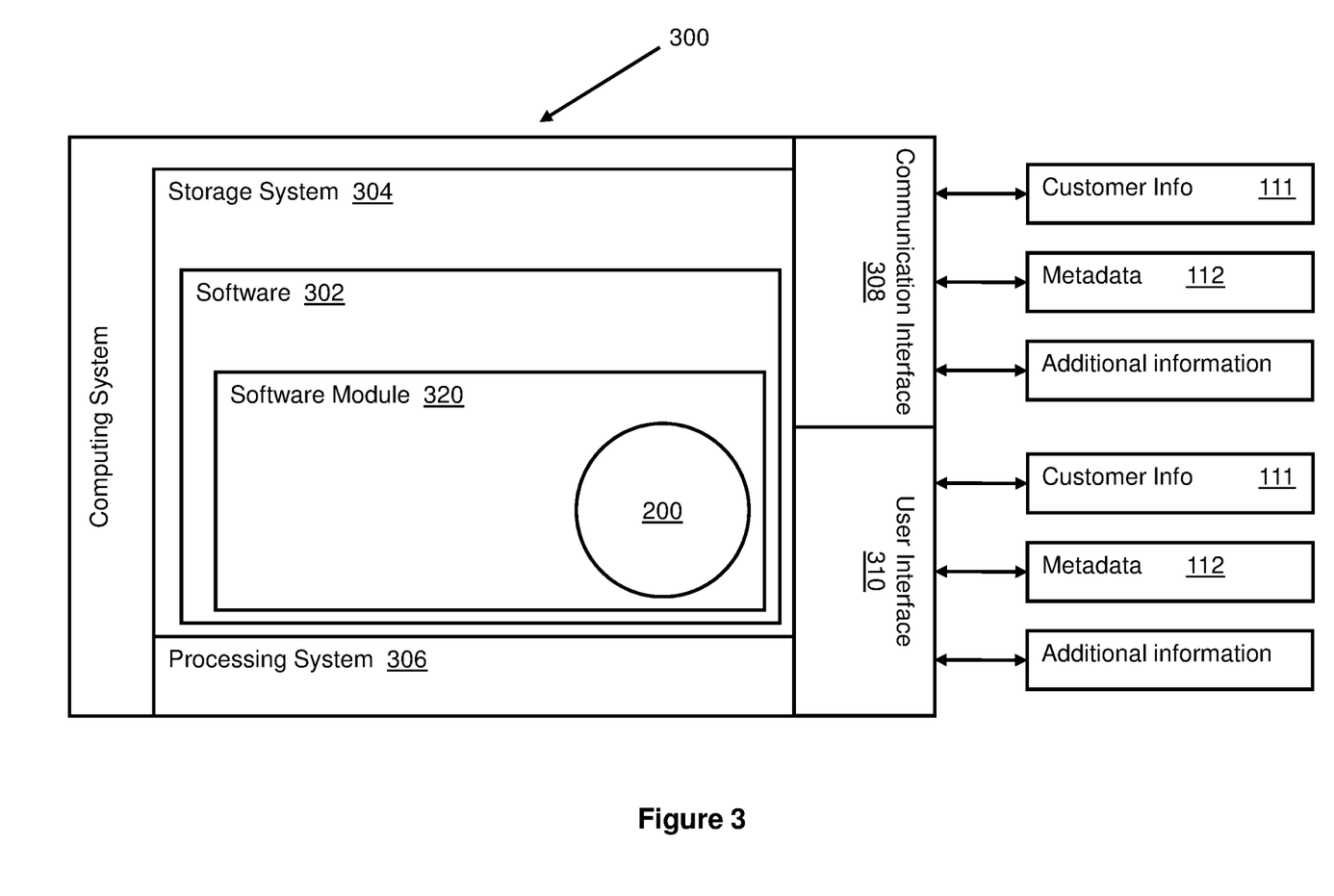
FIG. 3 depicts an exemplary embodiment of a computer system for gathering customer information through games.

FIG. 3 depicts an exemplary embodiment of a computer system 300 for gathering customer information through games using DM system 100. The computing system 300 may be used to implement embodiments of portions of the DM system 100, or in carrying out embodiments of the method 200. The computing system 300 may be part of or connected to the overall CEC system.

The system 300 is generally a computing system that includes a processing system 306, a storage system 304, software 302, a communication interface 308, and a user interface 310. The processing system 306 loads and executes software 302 from the storage system 304, including a software module 320. When executed by computing system 300, software module 320 directs the processing system 306 to operate as described in herein in further detail in accordance with the method 200.

The computing system 300 includes a software module 320 for executing method 200 and performing the function of DM system 100. Although computing system 300 as depicted in FIG. 3 includes one software module 320 in the present example, it should be understood that more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. The processing system 306 can be implemented within a single processing device but can also be distributed across multiple processing devices or sub-systems that cooperate in existing program instructions. Non-limiting examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as, but not limited to, computer readable instructions, data structures, program modules, or other information. The storage system 304 can be implemented as a single storage device but may also be implemented across multiple storage devices or sub-systems. The storage system 304 can further include additional elements, such a controller capable of communicating with the processing system 306.

Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

As described in further detail herein, computing system 300 receives and transmits data through communication interface 308. The data can include verbal or textual communications to or from a customer and details about a request, a work order, a back-office task, or any other set of data that will necessitate or result from an interaction between a customer and the CSR. In embodiments, the communication interface 308 also operates to send and/or receive information, such as, but not limited to, information to/from other external systems to which computing system 300 is communicatively connected, and to receive and process information from customer contacts 110, as described in greater detail above. Such information can include customer information 111, customer contact metadata 112, updates to DME 120, and/or updates to analytics rules 121.

The user interface 310 can include one or more of a mouse, a keyboard, a voice input device, a touch input device for receiving a gesture from a user, a motion input device for detecting non-touch gestures and other motions by a user, and/or other comparable input devices and associated processing elements capable of receiving user input from a user. Output devices such as, but not limited to, a video display or graphical display can display documents or another interface further associated with embodiments of the system and method as disclosed herein. Speakers, printers, haptic devices and other types of output devices may also be included in the user interface 310. CSRs or other staff can communicate with computing system 300 through the user interface 310 in order to view documents, enter or receive data or information, enter information into DME 120, manage an interaction or back-office task, or any number of other tasks the CSR or other staff may want to complete with computing system 300.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for gathering customer information through games played on a dynamic monitoring (DM) system in a customer engagement center (CEC) system, comprising:
   providing the DM system in the CEC system, wherein the DM system includes a dynamic monitoring engine (DME), a contact medium, a customer database, and a gaming library, wherein the contact medium is selected from the group consisting of a telephone line and an Internet connection, wherein the DME is operably connected to the contact medium, customer database, and the gaming library, wherein the DME includes a set of analytics rules, wherein the customer database includes one or more customer profiles, wherein the gaming library includes at least one game;
   the DME receiving a plurality of customer contacts over the contact medium, each of the plurality of customer contacts being received from a customer;
   for each of the plurality of customer contacts:
      retrieving, by the DME, for each of the plurality of customer contacts, a customer profile associated with the customer for a customer contact of the plurality of customer contacts, wherein the customer profile is a profile data structure including a plurality of fields of customer information associated with the customer from the customer contact;
      analyzing, by the DME, the profile data structure associated with the customer to determine one or more fields from the plurality of fields with missing customer information;
      generating, by the DME, a missing information indication for each field of the plurality of fields of the profile data structure with missing customer information based on the analyzing;
   the DME transmitting a gameplay offer to each customer associated with the plurality of customer contacts over the contact medium;
   receiving, by the DME, one or more acceptances of the gameplay offers;
   upon receipt of an acceptance of the gameplay offer from one customer of the customers associated with the plurality of customer contacts:
      the DME selecting at least one game from the gaming library based on the missing information indications for the profile data structure associated with the customer, wherein the game allows for acquisition of the customer information associated with the missing information indications for the profile data structure,
      the DME running the game selected for play with the customer to acquire the customer information associated with the missing information indications for the profile data structure, and
      the DME updating the one or more fields of the profile data structure with the customer information acquired from the customer playing the game;
   receiving, by the DME, one or more refusals of the gameplay offers; and
   upon receipt of a refusal of the gameplay offer from one customer of the customers associated with the plurality of customer contacts, placing the customer contact associated with the refusal in a queue.

2. The method of claim 1, further the DME comprising processing any known identifying customer information before transmitting the gameplay offer.

3. The method of claim 1, further comprising the DME transmitting a request for identifying customer information before retrieving the profile data structure associated with the customer associated with the customer contact of the plurality of customer contacts.

4. The method of claim 3, further comprising the DME receiving a response to the request for identifying customer information before retrieving the customer profile associated with the customer for the customer contact of the plurality of customer contacts.

5. The method of claim 3, further comprising the DME repeating transmitting a request for identifying customer information if more identifying customer information is needed to identify the customer profile associated with the customer for the customer contact of the plurality of customer contacts.

6. The method of claim 1, further comprising the DME transmitting to the customer a choice between at least two games from the gaming library after selecting at least one game from the gaming library.

7. The method of claim 1, further comprising the DME acquiring customer mood information via capture and analysis of voice or text communications during game play.

8. The method of claim 7, further comprising the DME updating the profile data structure for the customer with the customer mood information acquired.

9. The method of claim 1, further comprising the DME updating customer contact metadata with the customer information acquired.

10. The method of claim 1, further comprising the DME repeating transmitting the gameplay offer to each customer associated with the plurality of customer contacts to each non-responsive customer until an acceptance or a refusal of the gameplay offer is received from the non-responsive customer.

11. The method of claim 1, further comprising the DME repeating transmitting the gameplay offer to each customer in the queue after a period of time.

12. The method of claim 11, wherein the period of time is predetermined.

13. The method of claim 11, wherein the period of time is variably determined by analytics rules.

14. The method of claim 11, wherein the period of time is variably determined by the customer.

15. A customer engagement center (CEC) system for gathering customer information through games, comprising:
a dynamic monitoring (DM) system, comprising:
- a DM processor; and
- a computer readable medium comprising computer readable code that upon execution by the DM processor causes the system to execute a method for gathering customer information through games, comprising:
  - receive a plurality of customer contacts over a contact medium, each of the plurality of customer contactes being received from a customer;
  - for each of the plurality of customer contacts;
    - retrieve, by the DM processor, a customer profile associated with the customer for a customer contact of the plurality of customer contacts, wherein the customer profile is a profile data structure including a plurality of fields of customer information associated with the customer from the customer contact;
    - analyze, by the DM processor, the profile data structure associated with the customer to determine one or more fields from the plurality of fields with missing customer information;
    - generate, by the DM, a missing information indication for each field of the plurality of fields of the profile data structure with missing customer information based on the analyze;
    - transmit a gameplay offer each customer associated with the plurality of customer contacts over the contact medium;
    - receive, by the DM processor, one or more acceptances of the gameplay offers;
    - upon receipt of an acceptance of the gameplay offer from one customer of the customers associated with the plurality of customer contacts;
      - select at least one game from a gaming library based on the missing information indications for the profile data structure associated with the customer, wherein the game allows for acquisition of the customer information associated with the missing information indications for the profile data structure,
      - run the game selected for play with the customer to acquire the customer information associated with the missing information indications for the profile data structure, and
      - update the one or more fields of the profile data structure with the customer information acquired from the customer playing the game;
    - receive, by the DM processor, one or more refusals of the gameplay offers,
    - upon receipt of a refusal of a gameplay offer from one customer of the customers associated with the plurality of customer contacts, place the customer contact associated with the refusal in a queue.

16. The CEC system of claim 15, wherein the contact medium is selected from the group consisting of a telephone line and an Internet connection.

17. The CEC system of claim 15, wherein the gaming library includes a plurality of games capable of being played over the contact medium.

18. The CEC system of claim 15, wherein each profile data structure includes fields for identity information, marketing information, security information, and customer contact history.

19. A non-transitory computer readable medium comprising computer readable code that upon execution by a dynamic monitoring (DM) processor causes a system to execute a method for gathering customer information through games on a customer engagement center (CEC) system, comprising:
- receive a plurality of customer contacts over a contact medium, each of the plurality of customer contacts being received from a customer;
- for each of the plurality of customer contact:
  - retrieve a customer profile associated with the customer for a customer contact of the plurality of customer contacts, wherein the customer profile is a profile data structure including a plurality of fields of customer information associated with the customer from the customer contact;
  - analyze the profile data structure associated with the customer to determine one or more fields from the plurality of files with missing customer information;
  - generate a missing information indication for each field of the plurality of fields of the profile data structure with missing information based on the analysis;
- transmit a gameplay offer to each customer associated with the plurality of customer contacts over the contact medium;
- receive one or more acceptances of the gameplay offers;
- upon receipt of an acceptance of the gameplay offer from one customer of the customers associated with the plurality of customer contacts:
  - select at least one game from a gaming library based on the missing information indications for the profile data structure associated with the customer, wherein the game allows for acquisition of the customer information associated with the missing information indications for the profile data structure;
  - run the game selected for play with the customer to acquire the customer information associated with the missing information indications for the profile data structure; and
  - update the one or more fields of the profile data structure with the customer information acquired from the customer playing the game;
- receive one or more refusals of the gameplay offers;
- upon receipt of a refusal of the gameplay offer from one customer of the customers associated with the plurality of customer contacts, place the customer contact associated with the refusal in a queue.

* * * * *